United States Patent [19]

Nakamura

[11] Patent Number: 4,942,797
[45] Date of Patent: Jul. 24, 1990

[54] PROGRAMMABLE CONTROLLED TURNBLANKING MACHINE

[75] Inventor: Susumu Nakamura, Tokyo, Japan

[73] Assignee: Sankyo Oilless Industry, Inc., Tokyo, Japan

[21] Appl. No.: 267,850

[22] Filed: Nov. 7, 1988

[51] Int. Cl.$^5$ ............................................. B26D 7/00
[52] U.S. Cl. ........................................ 83/76.9; 83/160;
83/517; 83/559; 83/701
[58] Field of Search ................. 83/71, 50, 55, 202,
83/212.1, 213, 214, 255, 374, 380, 356.3, 547,
559, 618, 619, 620, 641, 158, 160, 155, 859, 436,
405, 445, 438, 519, 516, 517, 518, 215, 216, 237,
255

[56] References Cited

U.S. PATENT DOCUMENTS

| | | | |
|---|---|---|---|
| 1,956,443 | 4/1934 | Hertel | 83/559 |
| 2,489,583 | 11/1949 | Messenger | 83/50 |
| 2,766,825 | 10/1956 | Pater et al. | 83/380 |
| 3,190,159 | 6/1965 | Wilkie et al. | 83/445 |
| 3,244,044 | 4/1966 | Lohmeyer, Jr. et al. | 83/202 |
| 3,455,197 | 7/1969 | Richardson | 83/517 |
| 3,839,935 | 10/1974 | Daniels | 83/160 |
| 4,331,050 | 5/1982 | Gergek | 83/71 |
| 4,799,411 | 1/1989 | Peake | 83/50 |

Primary Examiner—Frank T. Yost
Assistant Examiner—Hwei-Siu Payer
Attorney, Agent, or Firm—Notaro & Michalos

[57] ABSTRACT

A programmable controlled turnblanking machine comprising a blanking apparatus having a pair of blank dies each provided with a cutting edge and disposed in a strip feed direction on a bed to cut out blanks of predetermined shape and size from a strip by means of the cutting edges of the blank dies, one of the blank dies being disposed in front in the strip feed direction and preventing from sliding in the strip feed direction, and the other blank disposed in the rear in the strip feed direction so as to be slidable on the bed in the same direction, both blanked dies being rotatably supported on the bed; a teaching unit for inputting a slide distance X of the rear blank die as well as rotational angles $\theta_1$ and $\theta_2$ of both front and rear blank dies and setting positioning data for the blank dies as program data; and a control box for automatically setting initial positions of the paired blank dies in accordance with a program based on the said program data set by the teaching unit and controlling blank cutting operations of the blanking apparatus automatically.

3 Claims, 6 Drawing Sheets

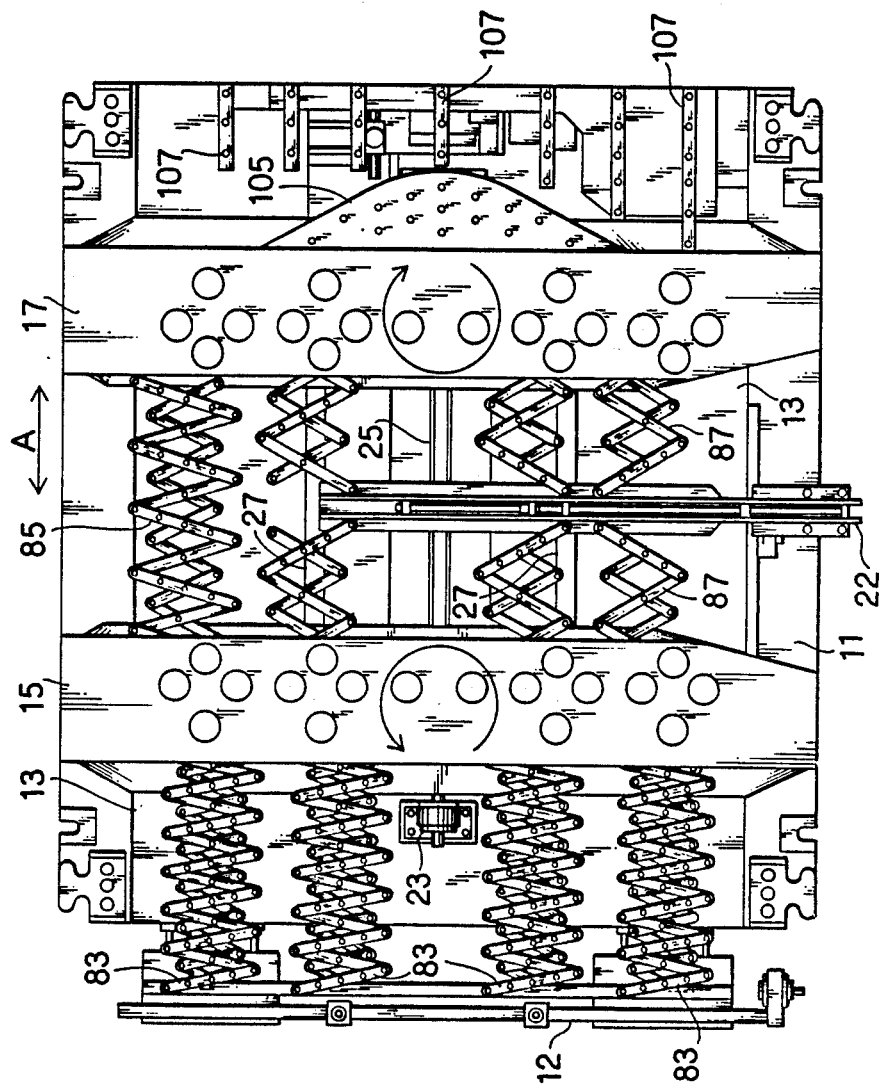

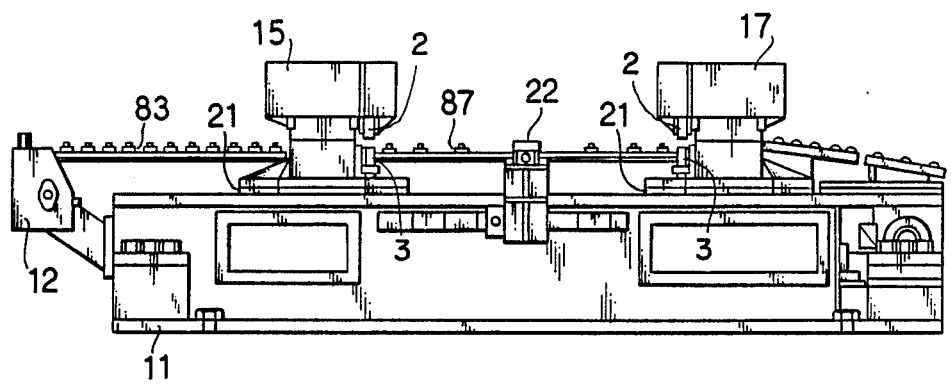
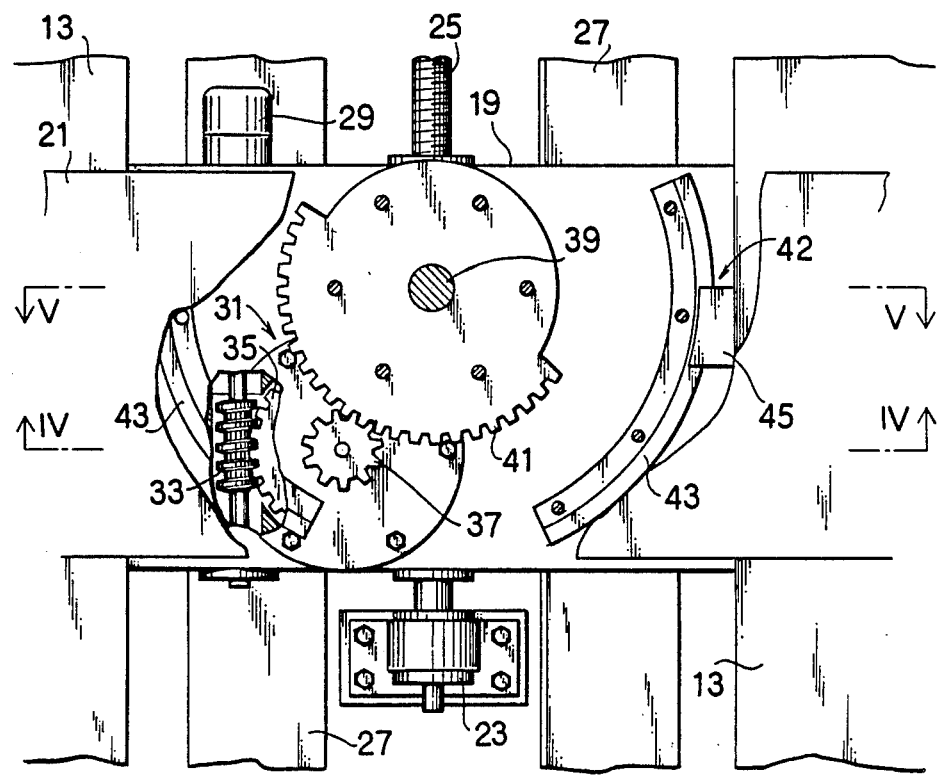

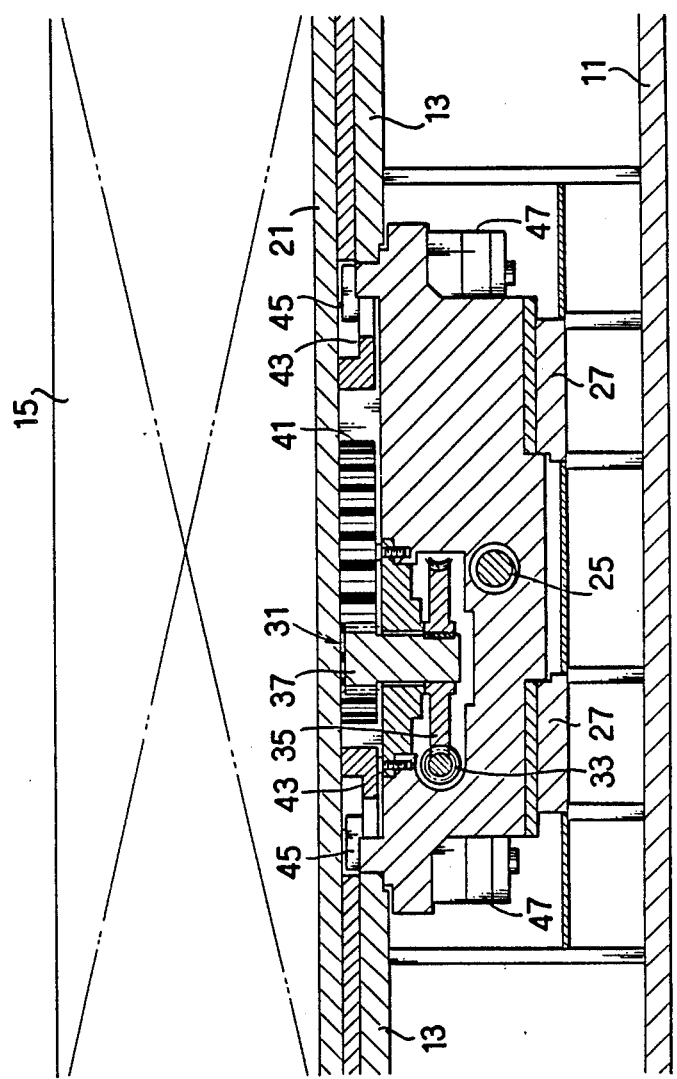

PROGRAMMABLE CONTROLLED TURNBLANKING MACHINE

BACKGROUND OF THE INVENTION

1. Field of the Invention

The present invention relates to a blanking apparatus for cutting out blanks from a strip and more particularly to a programmable controlled turnblanking machine wherein a pair of blank dies each having a cutting edge are disposed on a bed in a direction in which the said strip is fed, and in order to cut the strip to predetermined shape and size by means of the cutting edges of the blank dies, the blank die located in front in the said strip feed direction is supported on the bed rotatably about its central part, while the blank die located in the rear in the said strip feed direction is supported on the bed rotatably in the same manner as in the front blank die and slidably in the said feed direction, and the blank cutting operation of the blanking apparatus is performed automatically according to a program in which are written positioning data comprising angles $\theta_1$, $\theta_2$ of the said rotations of both blank dies and a slide distance X of the rear blank die.

2. Description of the Prior Art

According to conventional methods for obtaining a large number of blanks such as trapezoidal or rectangular blanks of different sizes and angles from a strip, a pair of blank dies each having a cutting edge are positioned appropriately at every lot and are moved while measuring the spacing between the cutting edges according to the size of a blank to be obtained, or a gauge board is fixed removably to a bolster of a blanking machine, then locate pins are implanted into the gauge board and lugs formed on the blanking dies are brought into engagement with the locate pins.

However, a considerable degree of skill is required for moving the blank dies in conformity with the size of a blank to be obtained; besides, if the size and angle should be mistaken, it is likely that all of the blanks obtained will be useless. Further, a conveyor located between both blank dies has not been fully responsive to rotations or movements of the blank dies.

Additionally, it is difficult to firmly fix the blank dies so that their angle and position once set are not displaced by impact or the like induced by the blank cutting operation. And if this is to be realized using a conventional hydraulic mechanism, not only the entire apparatus will become very large in size but also a complicated layout of oil feed pipe will result.

In the conventional blanking dies, moreover, the time required for their mounting at every change in shape of blank is long and so in the recent multi-variety, small lot production a great decrease in operating efficiency of blanking dies is unavoidable.

SUMMARY OF THE INVENTION

The present invention has been accomplished in view of the above-mentioned problems and it is the object thereof to provide a programmable controlled turnblanking machine capable of affording a blanking apparatus wherein the positioning for a pair of blank dies can be effected by automatic control such as numerical control using a computer.

According to the programmable controlled turnblanking machine of the present invention, one blank die disposed in front in a strip feed direction is prevented from sliding in the same direction, while the other blank die disposed in the rear in the said strip feed direction is mounted slidably in the said strip feed direction along the upper surface of a bed, both blank dies being supported on the bed surface rotatably about the respective central portions. The slidable, rear blank die is moved in accordance with the shape and size of a blank to be cut out, while both blank dies are rotated at an angle set according to the shape and size of the blank. These operations are performed automatically according to positioning data written in advance by predetermined operations of a teaching unit for example.

BRIEF DESCRIPTION OF THE DRAWINGS

FIG. 1 is a plan view of a blanking apparatus according to an embodiment of the present invention;

FIG. 2 is a front view thereof;

FIG. 3 is a partially cut-away plan view showing an example of a positioning mechanism for blank dies used therein;

FIG. 4 is a sectional view taken on line IV—IV of FIG. 3;

DETAILED DESCRIPTION OF THE PREFERRED EMBODIMENTS

An embodiment of the present invention will be described hereinunder with reference to the accompanying drawings.

Figure 5:
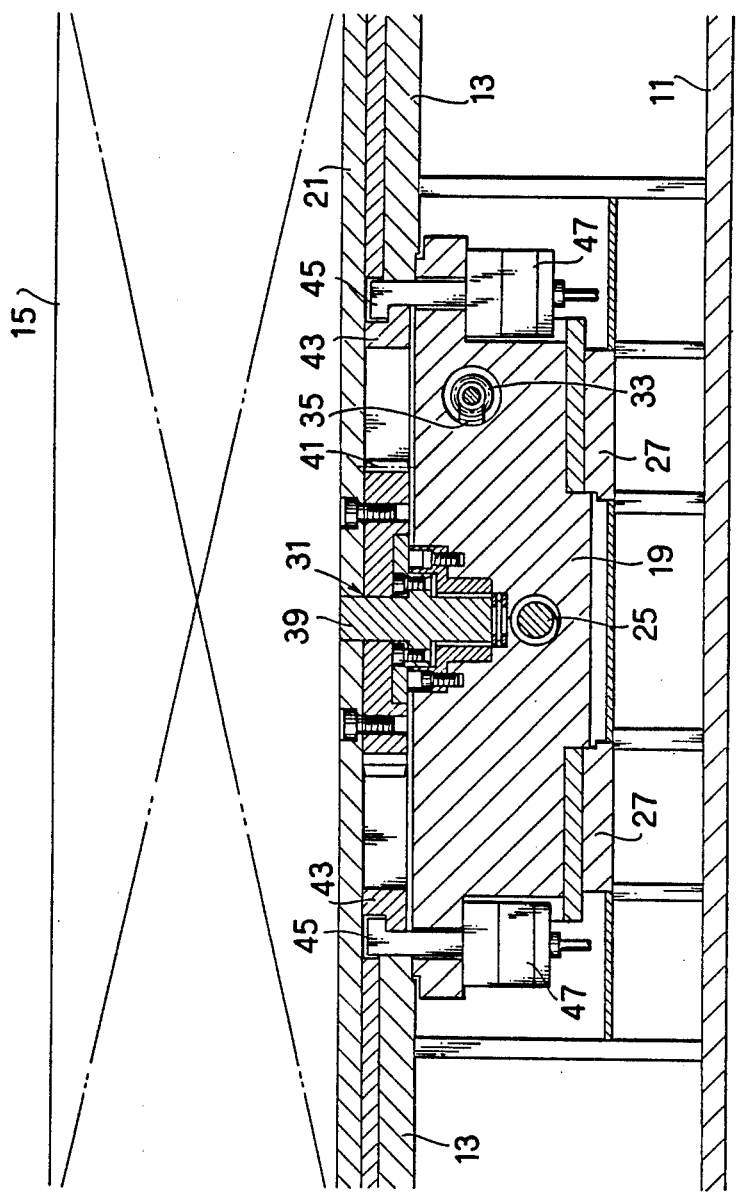
FIG. 5 is a sectional view taken on line V—V of FIG. 3.

In FIGS. 1 to 5, the reference numeral 11 denotes a bed of a blanking apparatus which constitutes a programmable controlled turnblanking machine; numeral 12 denotes a strip guide; numeral 13 denotes a pressure bearing plate; numerals 15 and 17 each denote a blank die having a cutting edge 2 and 3, the blank dies 15 and 17 being mounted on a blank die mounting plate 21 supported on beams 27 connected on a base 19 which is supported on the bed 11. Only the blank die 15, disposed in the rear in the strip feed direction, slides in the same direction along the upper surface of the bed 11. Therefore, only the base 19 with the blank die 15 mounted thereon is in threaded engagement with a feed screw 25 which is connected to a servomotor 23 with rotation of screw 25, and with its rotation the blank die 15 slides in the strip feed direction and reciprocates as indicated by arrow A. As shown in FIGS. 3, 4 and 5, mounting plate 21 slides on pressure bearing plate 13 and base 19 slides on beams 27.

Numeral 22 denotes a pusher disposed between the blank dies 15 and 17 on the bed 11. The pusher 22 moves in response to sliding of the blank die 15 so as to be always positioned centrally between the blank dies 15 and 17. The pusher 22 functions to push out a cut blank to a piler (not shown) disposed at a side portion of the blanking apparatus body. Right and left positions of the pusher 22 can be adjusted by operating a feed screw with a handle (neither shown) according to the shape of the blank to be cut.

Numeral 29 denotes a cutter rotating servomotor which is mounted on the base 19, and numeral 31 denotes a rotation transfer mechanism for transferring the rotation of the servomotor 29 to the blank die mounting plate 21. The rotation transfer mechanism 31 comprises a worm 33 connected directly to the servomotor 29, a worm wheel 35 supported by the base 19 through a shaft and in mesh with the worm 33, a gear 37 connected directly to the worm wheel 35, and a sector gear 41 fixed to the blank die mounting plate 21 concentrically with a rotary shaft 39 and in mesh with the gear 37.

Numeral 42 in FIG. 3 one of few mechanisms denotes a clamp mechanism for clamping the rotary movement of the blank die mounting plate 21 around shaft 39. Each clamp mechanism 42 comprises a clamp drum 43 and a clamp piece 45. The clamp drum 43 is an arcuate metallic having a generally L-shaped section member as shown in FIG. 3 as shown in FIG. 5 and the pair of clamp drums 43 are fixed to the bottom of the blank die mounting plate 21 concentrically with the rotary shaft 39. Each clamp piece 45 is formed in a generally inverted L shape and it is projecting from the upper surface of the base 19 in corresponding relation to the clamp drum 43.

Numeral 47 denotes a hydraulic mechanism for driving each clamp mechanism 42. By the action of the hydraulic 47 mechanisms each clamp piece 45 is pulled down and brought into pressure contact with the clamp drum 43 to clamp the blank die mounting plate 21 down on bearing plate 13 as shown in FIG. 5.

Figure 6:
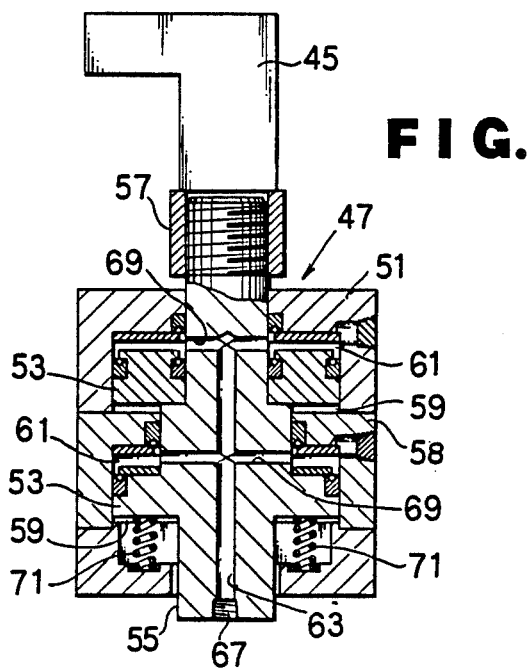
FIG. 6 is a sectional view showing an example of a hydraulic mechanism for driving a blank die clamp mechanism.

Referring now to FIG. 6, there is shown the details of the hydraulic mechanism 47, in which the numerals 51, 53 and 55 denote a cylinder, a piston and a piston rod, respectively, and numeral 57 denotes a joint for connecting the piston rod 55 to the clamp piece 45. Within the cylinder 51 are formed two piston receiving chambers 59 by means of a partition wall 58, and in Each piston chamber 59 receives and of two pistons 53. The pistons 53, each fixed to the piston rod 55, are slidable in the axial direction of the piston rod 55 through the respective chambers 59. Between one end face of each piston and the wall surface of each piston receiving chamber 59 there is formed a pressure chamber 61.

Numeral 63 denotes an oil feed passage formed axially in the piston rod 55 and is open in the lower end face of the piston rod to form a connection 67 with an oil feed pipe. Numeral 69 denotes a branch passage formed in the piston rod 55, branching from the oil feed passage 63 and communicating with each pressure chamber 61. Numeral 71 denotes a coil spring which urges the piston 53 and piston rod 55 upwards at all times.

Figure 7:
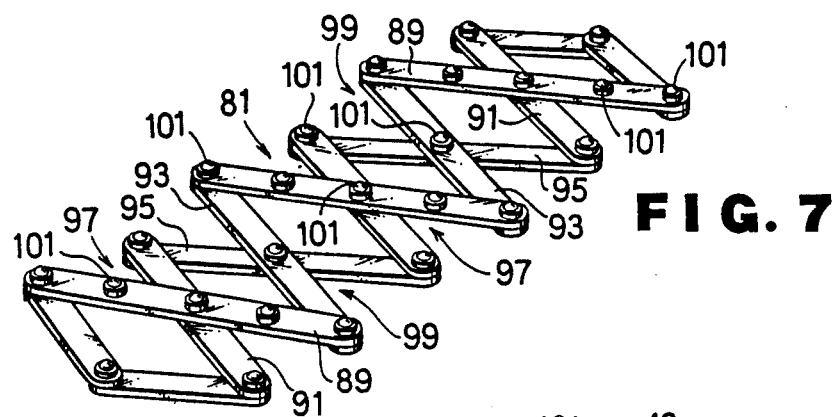
FIG. 7 is a detailed construction diagram of a pantograph 81.

FIG. 7 is an enlarged perspective view of a pantograph mechanism 81 used in the invention and constituting a ball conveyor. In FIGS. 1, 2 and 7, numerals 83, 85 and 87 denote first, second and third conveyors, respectively, constituted by such a pantograph mechanism 81 as shown in FIG. 7. As illustrated in the same figure, a pair of arms 89 and 91, or 93 and 95, are connected together pivotably at their central portions to form an arm pair 97 or 99. Such arm pairs 97 and 99 are arranged alternately in a large number and the arms 89 and 93, or 91 and 95, are connected together pivotably at end portions thereof, whereby the arm pairs 97 and 99 are alternately connected continuously to constitute the pantograph mechanism 81 which is expansible. On the upper surfaces of the upper arms 89 of the pantograph mechanism 81 there are disposed a plurality of balls 101 which are held rotatably to form a ball conveyor. The balls 101 are rotatably disposed also on the upper surfaces of the pivoted portions of the arms 89, 91, 93 and 95 so that the upper ends of the balls 101 are on the same level.

In the first conveyor 83 of such a structure, one end of the pantograph mechanism is attached to the strip guide 12 and the other end thereof attached to the blank die 15. Likewise, the second conveyor 85 is mounted between the blank dies 15 and 17 and the third conveyor 87 mounted between the blank die 15 and the pusher 22 and between the pusher 22 and the blank die 17 to keep the pusher centered between the first and second blanking dies. Numeral 105 denotes a fourth conveyor mounted to the blank die 17 and numeral 107 denotes a fifth conveyor extending from the fourth conveyor 105, neither of the conveyors 105 and 107 being expansible.

Figure 8:
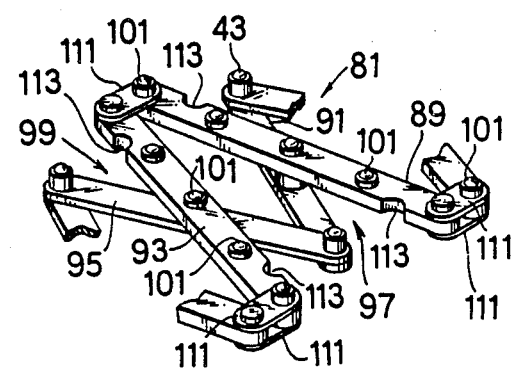
FIG. 8 is a construction diagram of a modification of FIG. 7.

The ball conveyor pantograph mechanism 81 is not limited to the construction of FIG. 7. For example, as shown in FIG. 8, arm pairs 97 and 99 may be connected together pivotably through metallic pieces 111 without superposing end portions of the arms 89 and 93 one on the other. In this case, the arms 89 and 91 may each be formed with cutouts 113, whereby the pantograph mechanism 81 can be contracted until the arms 89 and 91 come into close contact with each other; further, the upper surfaces of the arms 89 and 93 become equal in level, thus permitting the balls 101 to be disposed also on the upper surface of the arm 93 in the same manner as on the upper surface of the arm 89.

It is not always necessary to dispose the balls 101 throughout the upper surfaces of all the upper arms of the pantograph mechanism 81. They may be disposed on only minimum upper arm surfaces provided this will not cause an obstacle to the blank taking-out operation.

Further connected to the blanking apparatus of the construction described above are a control box and a teaching unit which is for presetting with keys positional data (slide distance X of the rear blank die 15 and rotational angles $\sigma_1$, $\sigma_2$, of both blank dies 15 and 17) on the paired blank dies 15 and 17 to a memory in the said control box, to prepare a program beforehand in the memory. These blanking apparatus, control box and teaching unit constitute the programmable controlled turnblanking machine of the present invention.

Figure 9:
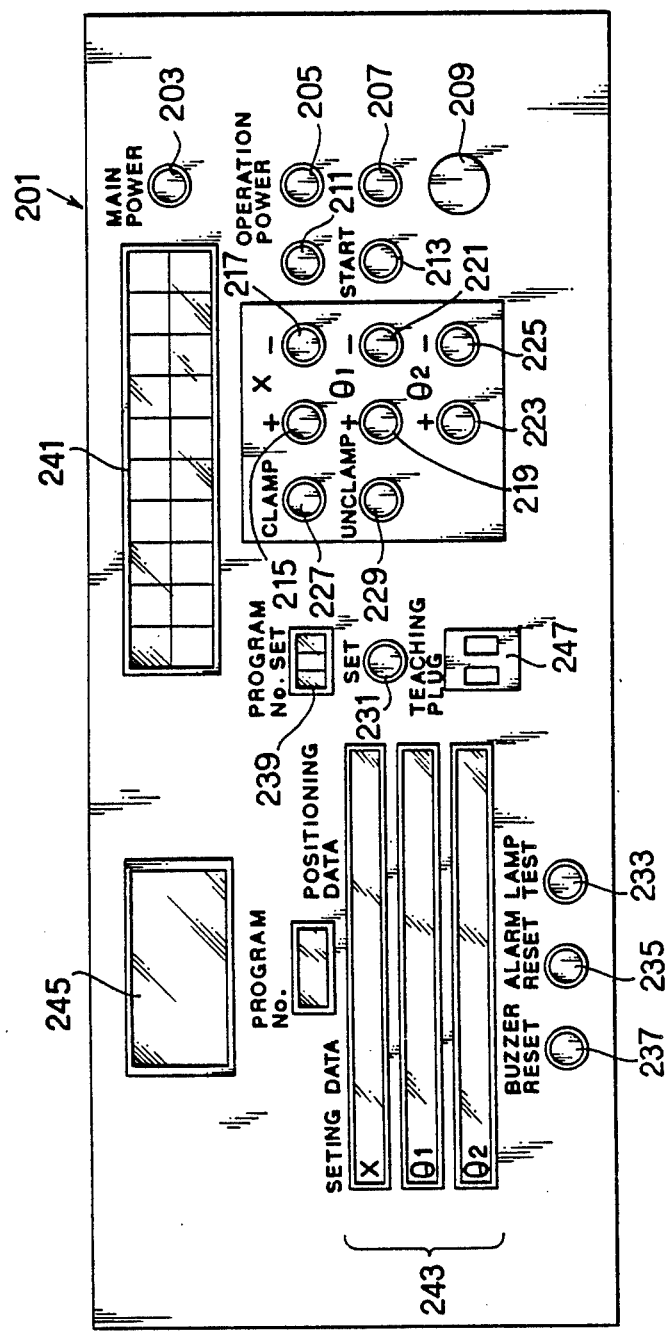
FIG. 9 is a construction diagram of an operating panel with a control box and teaching unit.

FIG. 9 shows the construction of an operating panel and schematically includes the control box and teaching unit of the invention. The control box contains a memory for storing a program based on the foregoing preset positioning data and an electronic circuit such as CPU having a control program for controlling the entire working process of the blanking apparatus. It functions to control the operation of the blanking apparatus directly. Further, the memory programs stored in the control box included information various blanks to be obtained in accordance with the positioning data which are pre-input with keys from the teaching unit as mentioned above. In addition, the control box itself can directly input the positioning data manually with switches, etc. on the operating panel shown in FIG. 9 and set positions of the paired blank dies 15 and 17 in accordance with the directly- and manually-input positioning data without using the program preset by the teaching unit.

On an operating panel 201 shown in FIG. 9, numeral 203 denotes a main power switch; numeral 205 denotes an operation power switch; numeral 207 denotes an operation preparation switch; numeral 209 an emergency stop switch; numeral 211 denotes a change-over switch for various modes, including manual and auto the details of which are omitted; numeral 213 denotes a start switch; numerals 215 to 229 represent switches for inputting the positioning data directly from the operating panel 201 of the control box and directly setting positions of the paired blank dies 15 and 17 numerals 215 and 217 being input buttons for the slide distance X of the blank die 15, numerals 219 and 221 being input buttons for the rotational angle $\theta_1$ of the blank die 15, numerals 223 and 225 being input buttons for the rotational angle $\theta_2$ of the blank die 17, numeral 227 being a clamp button for clamping the blank dies 15 and 17, and numeral 229 being an unclamp button for the same dies; numeral 231 denotes a set button; numeral 233 denotes a lamp test button; numeral 235 denotes an alarm reset button; numeral 237 denotes a buzzer reset button; numeral 239 denotes a digital switch for selecting one of the programs preset in the memory and inputting its program number; numeral 241 denotes a combination pilot lamp for lighting to indicate various work contents of the control box, twelve kinds of such contents being available. Numeral 243 denotes a numerical display unit. Positioning data X, $\theta_1$ and $\theta_2$ preset in the memory are called from the memory and displayed on the display unit 243, as the program of the program number specified by the digital switch 239. The said program number is also displayed thereon. Numeral 245 denotes a liquid crystal display unit and numeral 247 denotes a plug for the teaching unit to which is connected a plug socket of the teaching unit when the aforesaid positioning data are input with keys from an operating panel of the teaching unit into the memory in the control box and the aforementioned program is preset to the same memory.

On the operating panel (not shown) of the teaching unit there are disposed WR (write) key, SFT (soft) key, GO (execution) key, SET key, STEP+key, STEP−-key, X key, Y key, and NUMERIC key, in order to preset the positioning data (X, $\theta_1$, $\theta_2$) as program into the memory in the control box. Also provided on the same operating panel is a display portion for the display of input positioning data (X, $\theta_1$, $\theta_2$).

The following description is now provided about the blanking apparatus used in the invention and constituting the programmable controlled turnblanking machine of the above-described construction.

First, the entire operation of the blanking apparatus will now be explained. The angles of the blank dies 15 and 17 are adjusted according to the shape and size of the blank to be cut out. This is done by rotating the servomotor 29 in a predetermined direction by a predetermined number of revolution. The rotation of the servomotor 29 is transmitted to the blank die mounting plate 21 through the worm 33, worm wheel 35, gear 37 and sector gear 41 of the rotation transfer mechanism 31. The blank die mounting plate 21, with the blank die 15 or 17 carried thereon, rotates a predetermined angle about the rotary shaft 39 according to the rotating direction and number of revolution of the servomotor 29. At the same time, the servomotor 23 is also started, so that the servomotor threadedly engaged with the feed screw 25 slides a predetermined distance in a predetermined direction on the guide according to the shape and size of the blank to be cut out and in accordance with the rotating direction and number of revolutions of the servomotor 23 whereby the blank die mounting plate 21 with the blank die 15 thereon is moved up to a predetermined position.

In this way the blank dies 15 and 17 are each set at a predetermined angle and after the blank die 15 is set in a predetermined position, the hydraulic mechanism 47 is operated to bring the clamp piece 45 into pressure contact with the clamp drum 43, whereby the blank die mounting plate 21 is fixed and die setting is completed. After one lot of blanks is cut out, the die setting is performed in just the same manner as above according to the shape and size of the next lot of blanks. In this case, since the rotation and slide of the blank die 15 are effected by the servomotors 23 and 29, it is possible to make control using electrical signals and so numerical control using a computer is easily adoptable.

The foregoing operation for fixing the blank dies 15 and 17 by the hydraulic mechanism 47 and clamp mechanism 42 will now be explained more concretely. As previously noted, the blank dies 15 and 17 are each set at a predetermined angle and the blank die 15 is set in a predetermined position, then the hydraulic mechanism 47 is operated to bring the clamp piece 45 into pressure contact with the clamp drum 43, whereby the blank die mounting plate 21 is clamped and thus die setting is completed. In the positioning completed state of the blank dies 15 and 17, oil is fed under pressure from the oil feed pipe into each pressure chamber 61 through the oil feed passage 63 and branch passage 69 to depress the piston 53. In this case, since two pressure chambers 61 are formed, the total area of the piston surface on which is exerted the oil pressure is nearly doubled, so that a correspondingly strong force can be applied to the clamp piece 45 of the clamp mechanism 42. Thus, the blank dies can be fixed positively even by the use of a relatively small-sized hydraulic mechanism.

When one lot of blanks has all been cut out, the supply of oil from the oil feed pipe is stopped to remove the internal oil pressure of the pressure chamber 61. As a result, the piston 53 slides upwards by virtue of the coil spring 71 and the piston rod 55 rises. Consequently, in the clamp mechanism 42, the clamp piece 45 leaves the clamp drum 43 to unclamp the blank dies 15 and 17. Then, positioning for the blank dies 15 and 17 is performed in just the same manner as above according to the shape and size of the new lot of blanks and oil is fed to the hydraulic mechanism 47 to fix the blank dies 15 and 17.

Description will now be made concretely about the operation of the ball conveyor for conveying the blanks which have been cut in a predetermined shape by the blank dies 15 and 17, out of the blanking apparatus. According to the ball conveyor in the blanking apparatus of the invention constructed as above, a strip is fed a predetermined length by a strip feeder (not shown) along the strip guide 12 and over the first conveyor 83 and is cut into blanks of preset shape and size by the blank dies 15 and 17. Of the cut blanks, those which have been cut by the blank die 17 drop onto the fourth and fifth conveyors 105 and 107 and slide forwardly of the blanking apparatus by gravity along the inclination of the conveyors, (FIG. 2) while those which have been cut by the blank dies 15 and 17 drop onto the second and third conveyors 85 and 87 and are conveyed sideways of the blanking apparatus by the action of the pusher 22 which can push the cut piece to the side in a direction perpendicular to the feed direction A in FIG. 1.

When the blanks of this lot have all been cut out, the angles of the blank dies 15, 17 and the position of the former are set again according to the size of the next lot of blanks to be cut out. At this time, the first conveyor 83 and the second, third conveyors 85, 87 expand or contract in corresponding relation to the blank die 15 and the pusher 22 under the action of the pantograph mechanism 81. Consequently, the spacing between the strip guide 12 and the blank die 15 and that between the blank dies 15 and 17 are filled up automatically by the conveyor 83 or the conveyors 85, 87. Since the conveyors 83, 85 and 87 have balls 101 which are supported rotatably, there will be no obstacle to the conveyance of blanks even upon change in angle of the arms 89–95.

The following is an explanation of the operation for presetting a program from the teaching unit to the memory in the control box which program provides positioning data (X, $\theta_1$, $\theta_2$) for setting initial positions of the paired blank dies 15 and 17 in the blanking apparatus which performs the above operations to cut blanks.

First, the plug socket of the teaching unit is connected to the teaching plug 247 on the operating panel 201 of the control box and the change-over switch 211 is changed over to Teaching Mode. Further, the main power switch 203 and the operation power switch 205 are turned ON.

Then, WR key is depressed, thereafter SFT key and NUMERIC key are depressed to input the program number of the positioning data to be input, then the slide distance X as positioning data is input with NUMERIC key, STEP+ key, STEP− key, or X key, Y key, and is written with GO key. Likewise, upon completion of writing of the slide distance X, the rotational angles $\theta_1$ and $\theta_2$ are input and written successively. As a result, plural kinds of programs affording positioning data (X, $\theta_1$, $\theta_2$) according to various blanks to be obtained can be preset in any desired number into the memory disposed in the control box.

Where one of such preset programs is called and the associated positioning data are set automatically to the blanking apparatus, these operations can be done as following using keys on the operating panel 201 of the control box. First, the change-over switch 211 is changed over to Auto Mode. Then, the program number of a desired program is input from the digital switch 239 and the set button 231 is turned ON, whereby the program data of this program number are read out from the memory. And the thus read-out program number as well as X, $\theta_1$, $\theta_2$ as positioning data are displayed. As a result, the servomotors 23 and 29 are driven while being controlled by the control program in the control box according to the data X, $\theta_1$ and $\theta_2$, so that the paired blank dies 15 and 17 move and their initial positions are set automatically. Thus, before start of the blank cutting operation, the blank dies 15 and 17 are set to initial positions quickly and automatically in a simple manner without requiring the troublesome manual operation which has heretofore been required. And after this automatic positional setting, the cutting operation is performed automatically in accordance with the control program in the control box. In this way all of the operations for cutting blanks are automated continuously.

On the other hand, the cutting operations can also be performed on the basis of positioning data which have manually been input directly from the operating panel 201 of the control box, by operating the various switches indicated at 215–229 on the operating panel 201 and performing operation similar to that of presetting programs from the teaching unit. In this case, therefore, the blank dies 15 and 17 are set to predetermined positions automatically in accordance with the positioning data which have been input directly from the control box without relying on the programs preset from the teaching unit.

Although the present invention has been described in detail in accordance with the illustrated embodiment, the invention is not limited thereto. For example, the servomotors 23 and 29 may be each substituted by a hydraulic mechanism, and the rotation transfer mechanism 31 also includes various variations.

Also, the number of pistons 53 and piston receiving chambers 59 of the hydraulic mechanism 59 may be increased to three or more.

Further, the connection between the arm pairs 97 and 99 may be done pivotably through metallic pieces 111 without overlapping of arms 89 and 93 at their end portions. In this case, the arms 89 and 91 may be formed with cutouts 113, whereby the pantograph mechanism 81 can be contracted until both arms come into close contact with each other; further, since the upper surfaces of the arms 89 and 93 become equal in level, it becomes possible to arrange balls 101 not only on the upper surface of the arm 89 but also on the upper surface of the arms 93.

It is not always necessary to arrange balls 101 on the upper surfaces of all the upper arms of the pantograph mechanism 81, that is, the balls 101 may be arranged on only the upper surfaces of a minimum number of arms provided this arrangement will not cause any obstacle to the operation for taking out blanks.

In the present invention, as set forth hereinabove, positioning for a pair of blank dies can be set automatically by a program of positioning data prewritten in the teaching unit or in accordance with positioning data which have manually been input directly from the control unit, to realize an automatic control such as numerical control using a computer. Consequently, positioning for a pair of blank dies can be done simply without requiring any skill and so the working efficiency is greatly improved.

In the present invention, moreover, the blank die disposed in front in the strip feed direction is prevented from sliding in the same direction and die setting is effected by sliding only the other blank die in the strip feed direction, so the spacing between the blank die disposed in front in the strip feed direction and the blank conveyor is not dependent on the width of the blank to be cut. Consequently, even blanks of small widths after cutting are sure to drop onto the blank conveyor and so, even without using any special conveyance mechanism, blanks after cutting can be conveyed automatically to a bland stocker.

Further, the clamp mechanism used in the invention for fixing the paired blank dies after positioning is provided with a plurality of the foregoing pressure chambers to enlarge the total area of the piston surfaces on which is exerted oil pressure, whereby a sufficiently strong force can be applied to the clamp lining of the blank die clamp mechanism to ensure fixing of the blank dies. Moreover, an oil feed passage is formed in the axial direction of the piston rod and a branch passage communicating with each pressure chamber mentioned above is branched from the oil feed passage, whereby an oil feed pipe may be merely connected to an opening portion of the oil feed passage and the arrangement thereof is extremely simple. Further, in automatic positioning for the blank dies, not only the angle and position of each blank die once set can be positively fixed so as not to be easily displaced by shocks in the blank cutting operation, but also it is possible to eliminate all of those requiring manual labor from such fixing operations. As a result, there is attained an excellent effect such that an automatic control such as numerical control using a computer can be applied easily to the blanking apparatus.

In the present invention, moreover, the conveyors in front and in the rear of the slidable blank die are expansible under the action of the pantograph mechanism, and even with sliding motion of the blank die when die setting is made again, the said conveyors expand or contract in correspondence to the position of the blank die, so it is no longer necessary to change the conveyors in front and in the rear of the slidable blank die at every die setting. Consequently, not only all of manual operations can be excluded but also the application of an automatic control such as numerical control using a computer to the blanking apparatus becomes easier.

What is claimed is:

1. A programmable controlled turnblanking machine having first and second blanking dies each provided with a cutting edge and disposed at predetermined positions in a strip feed direction on a bed in order to cut out blanks of predetermined shape and size from a strip in cooperation with each cutting edge of the blanking dies, said programmable controlled turnblanking machine comprising:
    a blanking apparatus having a first blanking die disposed in front in said strip feed direction and being prevented from sliding in the strip feed direction and being rotatably supported at a center thereof on said bed, and a second blanking die being disposed behind the first blanking die in said strip feed direction and so as to be slidable on the bed in the strip feed direction, the second blanking die being rotatably supported at a center thereof on said bed, said blanking apparatus including a pusher for pushing out blanks after cutting from between the first and second dies, and means connected to said pusher so that said pusher is always positioned at a center position between the first blanking die and the second blanking die when the second blanking die is moved on said bed;
    a teaching unit for inputting a rotational angle $\theta_1$ of said first blanking die, and a slide distance X of said second blanking die as well as rotational angle $\theta_2$ thereof and setting positioning data for the blanking dies as program data; and
    a control box for automatically calling predetermined positions of said first and second blanking dies by inputting a program number of a program based on said program data which have been set by said teaching unit and automatically controlling a slide position and each rotational angle of the first and second blanking dies of said blanking apparatus.

2. A programmable controlled turnblanking machine according to claim 1, wherein said blanking apparatus includes a ball conveyor for conveying blanks after cutting away from the blanking apparatus, said ball conveyor comprising a pantogaph mechanism having plural arm pairs each pivotably connected centrally and also at respective end portions thereof, and balls rotatably supported on upper surfaces of predetermined arms of said pantograph mechanism, said pantograph mechanism being attached to front and rear in the strip feed direction of the second blanking die.

3. A programmable controlled turnblanking machine having first and second blanking dies each provided with a cutting edge and disposed at predetermined positions in a strip feed direction on a bed in order to cut out blanks of predetermined shape and size from a strip in cooperation with each cutting edge of the blanking dies, said programmable controlled turnblanking machine comprising:
    a blanking apparatus having a first blanking die disposed in front in said strip feed direction and being prevented from sliding in the strip feed direction and being rotatably supported at a center thereof on said bed, and a second blanking die being disposed behind the first blanking die in said strip feed direction and so as to be slidable on the bed in the strip feed direction, the second blanking die being rotatably supported at a center thereof on said bed, said blanking apparatus including a hydraulic mechanism for actuating a blanking die clamp mechanism which is for clamping the movement of said blanking dies by fixing a blanking die support means, said hydraulic mechanism comprising a piston rod connected to a clamp piece of said clamp mechanism, a plurality of pistons fixed to said piston rod, and a cylinder having piston receiving chambers for each of said pistons, the pistons being received in said piston receiving chambers slidable in an axial direction of said piston rod to form a pressure chamber between a wall surface of each said piston receiving chamber and an end face of an associated piston received therein, said piston rod having an oil feed passage formed in the axial direction thereof and branch passages branching from said oil feed passage and communicating with said pressure chambers;
    a teaching unit for inputting a rotational angle $\theta_1$ of said first blanking die, and a slide distance X of said second blanking die as well as rotational angle $\theta_2$ thereof and setting positioning data for the blanking dies as program data; and
    a control box for automatically calling predetermined positions of said first and second blanking dies by inputting a program number of a program based on said program data which have been set by said teaching unit and automatically controlling a slide position and each rotational angle of the first and second blanking dies of said blanking apparatus.

* * * * *